US006981027B1

(12) United States Patent
Gallo et al.

(10) Patent No.: US 6,981,027 B1
(45) Date of Patent: Dec. 27, 2005

(54) METHOD AND SYSTEM FOR MEMORY MANAGEMENT IN A NETWORK PROCESSING SYSTEM

(75) Inventors: Anthony Matteo Gallo, Apex, NC (US); Seeta Hariharan, Raleigh, NC (US); Marco C. Heddes, Raleigh, NC (US); Sridhar Rao, Raleigh, NC (US); Colin Beaton Verrilli, Apex, NC (US); Gail Irene Woodland, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/546,653

(22) Filed: Apr. 10, 2000

(51) Int. Cl.⁷ .......................................... G06F 15/167
(52) U.S. Cl. .................... 709/216; 711/147; 711/148; 707/205
(58) Field of Search .................. 370/249, 429, 370/463, 466, 469; 709/223, 328, 400, 213; 455/507; 711/147, 148; 710/3; 707/205

(56) References Cited

U.S. PATENT DOCUMENTS

| | | | |
|---|---|---|---|
| 5,148,527 A | 9/1992 | Basso et al. ................. 395/325 |
| 5,517,662 A | 5/1996 | Coleman et al. ............ 395/800 |
| 5,566,321 A | 10/1996 | Pase et al. .................... 395/480 |
| 5,588,138 A | 12/1996 | Bai et al. ................ 395/497.04 |
| 5,608,720 A * | 3/1997 | Biegel et al. ................. 370/249 |
| 5,617,537 A | 4/1997 | Yamada et al. ......... 395/200.01 |
| 5,687,370 A | 11/1997 | Garst et al. .................. 395/622 |
| 5,784,697 A | 7/1998 | Funk et al. .................. 711/170 |
| 5,940,592 A | 8/1999 | Loki et al. ................ 395/200.3 |
| 5,940,870 A | 8/1999 | Chi et al. ..................... 711/206 |
| 5,944,788 A * | 8/1999 | Krantz et al. ................ 709/213 |
| 5,970,510 A | 10/1999 | Sher et al. ................... 711/149 |
| 5,999,976 A * | 12/1999 | Schmuck et al. ........... 709/226 |
| 6,021,331 A * | 2/2000 | Cooper et al. ............... 455/507 |
| 6,061,362 A * | 5/2000 | Muller et al. ................ 370/463 |
| 6,119,173 A * | 9/2000 | Pullen et al. ................ 709/328 |
| 6,148,377 A * | 11/2000 | Carter et al. ................. 711/147 |
| 6,321,276 B1 * | 11/2001 | Forin ............................. 710/3 |
| 6,327,631 B1 * | 12/2001 | Eastty et al. ................. 709/400 |
| 6,424,658 B1 * | 7/2002 | Mathur ........................ 370/429 |

(Continued)

FOREIGN PATENT DOCUMENTS

| | | | |
|---|---|---|---|
| JP | 07-231330 | 8/1995 | ........... H04L 12/46 |

(Continued)

OTHER PUBLICATIONS

"The RDT Router Chip: A Versatile Router for Supporting A Distributed Shared Memory," IEICE Transactions on Information Systems, vol. E80-D, No. 9 Sep. 1997, pp. 1-10.

(Continued)

*Primary Examiner*—John Follansbee
*Assistant Examiner*—Dustin Nguyen
(74) *Attorney, Agent, or Firm*—Josh G. Cockburn; Dillon & Yudell LLP (57) ABSTRACT

A method and system for memory management in a network processing system provides for allocation of physical memory areas within network processors coupled to a control point processor by a bus. The allocation scheme provides a memory management layer without requiring a complete operating system interface and supports asynchronous completion of the allocation requests. Multicast allocation is supported allowing an allocation to be simultaneously requested on multiple network processors. The allocation mechanism returns a token, which may then be used to access the memory location via a protocol over the bus, and a single token may refer to an allocation made on several network processors where the actual physical addresses and memory configurations are different.

20 Claims, 6 Drawing Sheets

U.S. PATENT DOCUMENTS

| | | | |
|---|---|---|---|
| 6,424,659 B2 * | 7/2002 | Viswanadham et al. | 370/469 |
| 6,510,164 B1 * | 1/2003 | Ramaswamy et al. | 370/466 |
| 6,604,136 B1 * | 8/2003 | Chang et al. | 709/223 |

FOREIGN PATENT DOCUMENTS

| | | | |
|---|---|---|---|
| JP | 11-317760 | 11/1999 | H04L 12/44 |
| JP | 11-346216 | 12/1999 | H04L 12/24 |

OTHER PUBLICATIONS

"Semi-Dynamic Distributed Data Managing Table for Distributed Shared Memory," IBM Disclosure Bullentin, vol. 37, No. 05 May 1994, pp. 281-283.

* cited by examiner

METHOD AND SYSTEM FOR MEMORY MANAGEMENT IN A NETWORK PROCESSING SYSTEM

BACKGROUND OF THE INVENTION

1. Technical Field

The present invention relates in general to computer networks, and in particular, to a network processor for managing network traffic. Specifically, the invention relates to memory management between a control point processor and network processors.

2. Description of the Related Art

Computer networks have evolved to a point where switch routers are insufficient to handle complex network routing and filtering requirements. Network processors, such as the International Business Machines (IBM) Network Processor (NP) have been developed to fill this need. Utilizing a connection similar to that of a network switch, the NP provides a level of control and flexibility that surpasses that of the network switch. Parallel lookup operations can be performed on a frame, complex modifications can be performed on packets, and policies can be managed at complex levels. Multiple processors are used to achieve a very high frame processing throughput.

It is not desirable to have a high overhead operating system running on a network processor. Due to the requirements of high frame processing throughput, the NP support tasks need to be reduced to a minimum. However, there is a need for memory allocation for data structures and control instructions that control the network processor. In addition, the NP may execute local applications, for example complex filtering applications performing frame filtering and blocking. These NP-based applications require a memory allocation scheme that does not require constant communication with a central control point. In addition, it is disadvantageous to require direct mapping of address space between central control point applications or operating systems running on a central processor and data structures or programs running on NPs.

Therefore, it would be desirable to provide a method and system for managing memory in a network processing system so that access to the memory can be achieved without requiring high processing overhead and direct mapping of address spaces between a control point processor and one or more network processors.

SUMMARY OF THE INVENTION

The objective of managing memory in a network processing system without requiring direct memory mapping is achieved in a method and system for managing memory in a network processing system, which includes a control point processor and multiple network processors (NPs). A dynamic memory manager, having a control point processor (CP) component and a network processor component, is provided for registering applications for allowing those applications to request allocation of memory on the NPs by transmitting a request from the CP component to the NP component over a bus. In response to a request, the NP allocates physical memory and returns a token representing the allocation from the NP component to the CP component. The token is used to provide read/write and other access to the physical memory.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
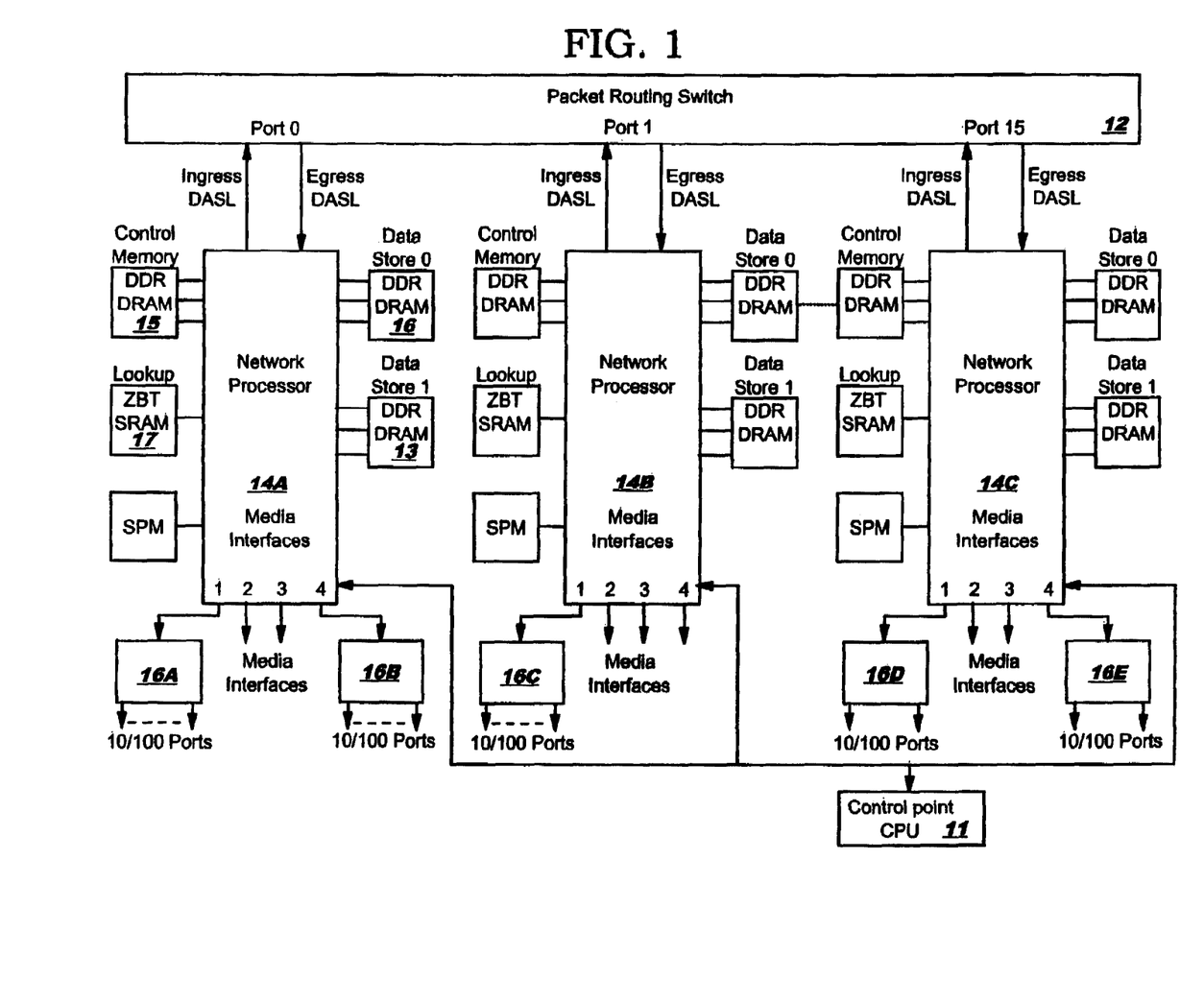
FIG. 1 is a block diagram of a network processor managed network subsystem in accordance with an embodiment of the present invention.

With reference to the figures, and in particular to FIG. 1, a network processing system in accordance with an embodiment of the present invention is depicted. A packet routing switch 12 is coupled to a group of network processors (NPs) 14A–14C. NPs 14A–14C provide media interfaces for connecting to networks having various protocols, such as 10 base-T or 100 base-T ethernet connections 16A–16E or other types of communication interfaces that are known in the art. Thus, NP 14A may route frames received at any of the media interfaces to port 0 on packet routing switch 12, and may perform address translations, respond to Quality-of-Service (QoS) requests, block packets, or perform any complex routing or frame processing function on the incoming frames. NP 14A also receives frames from port 0 on packet routing switch 12 via an Egress interface and may perform similar complex operations to route frames to the media interfaces. Control memory 15 provides storage for control software that drives the routing functionality and frame processing, and, specifically, the software managed tree (SMT) dynamic classifier of the present invention. Lookup ZBT SRAM 17 provides fast access memory for storing fixed match tree (FMT) hardware assisted matching trees and can be used to provide fast storage for SMTs or portions thereof. Control point central processing unit (CPU) 11 provides management of network processor operations and downloading of applications, classifier trees and other data. CPU 11 compiles and creates the SMTs for downloading. The SMTs are built by applications running on CPU 11, then downloaded to memory coupled to NPs 14A–14C.

Figure 2:
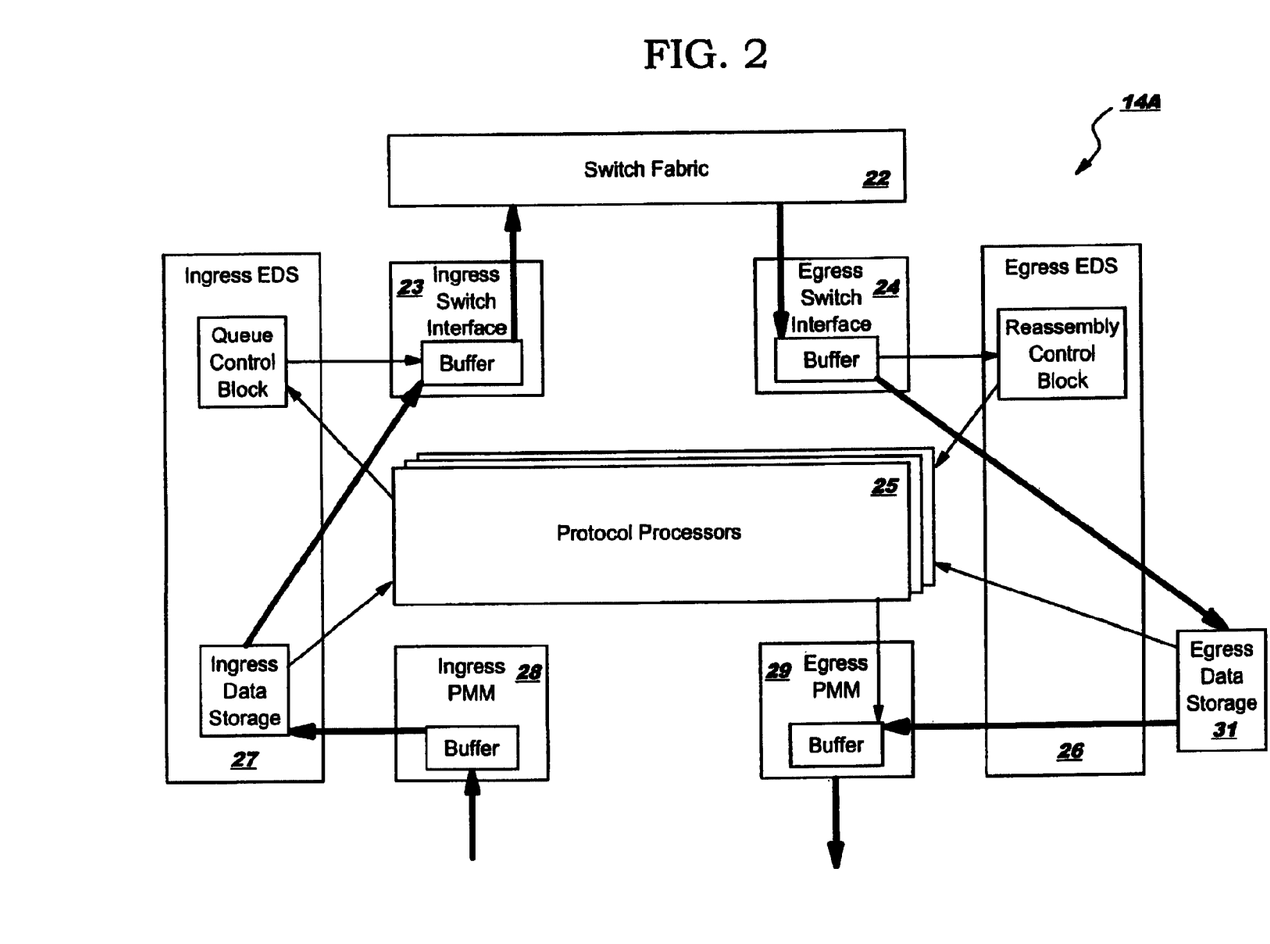
FIG. 2 is a simplified block diagram depicting frame flow within a network processor in accordance with an embodiment of the present invention.

Referring now to FIG. 2, a simplified block diagram of NP 14A is shown. Ingress Enqueue/Dequeue/Scheduling logic (EDS) 27 manages frame buffering and control for frames routed to switch fabric 22. Frames are received from the media interface connections by ingress physical MAC (Medium Access Control) multiplexer (PMM) 28, and are translated and processed by protocol processors 25. An ingress switch interface 23, provides a connection to switch fabric 22 and may connect to another NP or a packet routing switch 12. An egress switch interface 24 receives frame data from switch fabric 22 and the frame data is stored in egress data storage 31. Protocol processors 25 can then perform classifier searches to process the frames and route them through an egress PMM 29.

Figure 3:
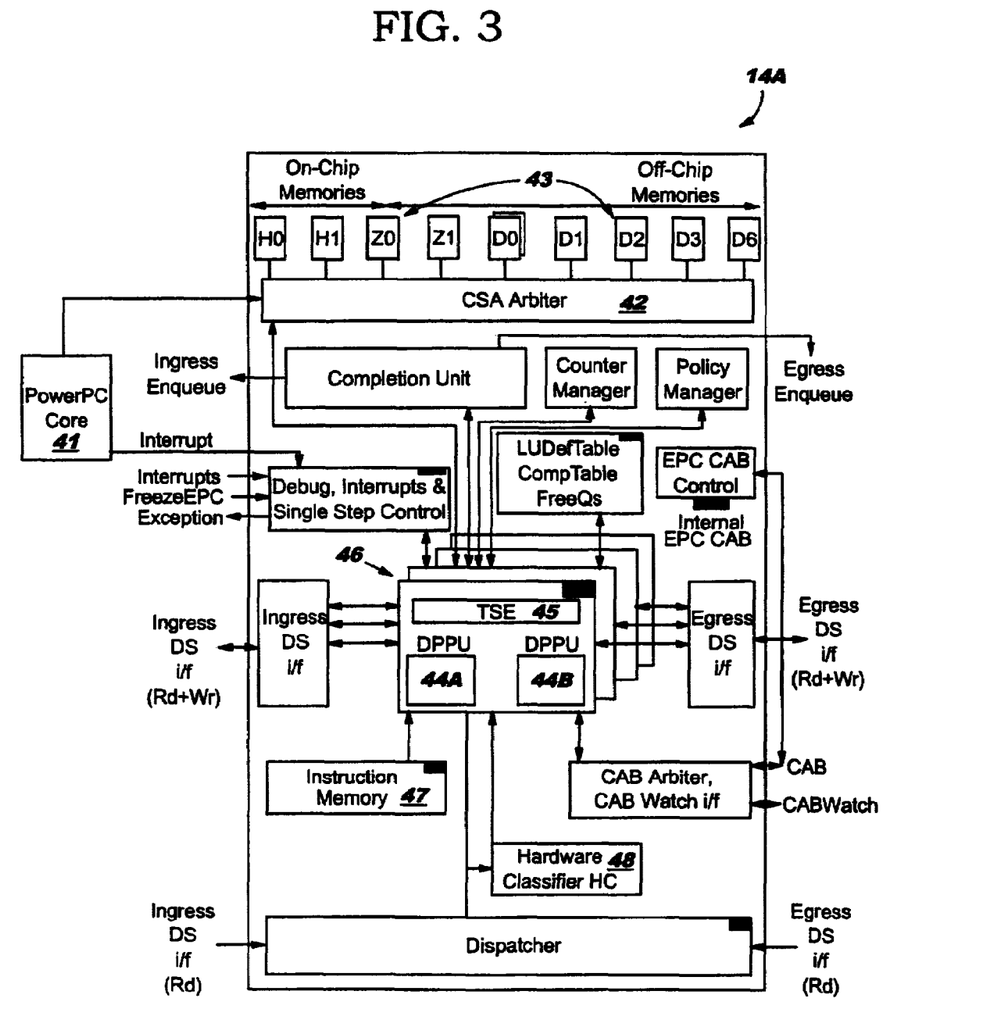
FIG. 3 is a detailed block diagram depicting a network processor in accordance with an embodiment of the present invention.

Referring now to FIG. 3, a detailed block diagram of NP 14A in accordance with a preferred embodiment of the invention is depicted. Memories 43 for storing frame data, classifier trees and applications data and instructions are coupled to the NP by control store arbiter 42, allowing core processing units 46 to share access to external and internal memory. Each core processing unit 46 contains dyadic protocol processing units (DPPU) 44A–44B and tree search engine 45. An instruction memory 47 is coupled to the core processing unit 46 for storing the picocode that drives the tree search engines 45 (TSEs). Power PC® processor core 41, provides management of the network processor unit 40. Software managed tree data and fixed match tree data may be downloaded into memories 43 to provide control for TSEs 45. Once a leaf in the tree is matched, it is loaded into internal registers in the network processor unit 40. The trees used with TSEs 45 are referred to as static or dynamic trees. Dynamic trees are so called because they may be updated incrementally and quickly to produce changes in the processing of frames. Static trees are not incrementally upgraded and require a reload of the tree each time the tree is modified. Static trees are useful for providing more complex matching such as applying a leaf to a range of IP addresses. Hardware classifier 48 pre-processes received frames to prepare for matching.

The present invention embodies a method and system for managing memory on NPs 14A–14C so that the applications on CPU 11 and applications running on NPs 14A–14C may allocate memory for use in storing control instructions, data, and frame classifier trees. This memory may be data storage for NP applications, data storage for CP applications, SMT storage for frame classifiers, etc.

Figure 4:
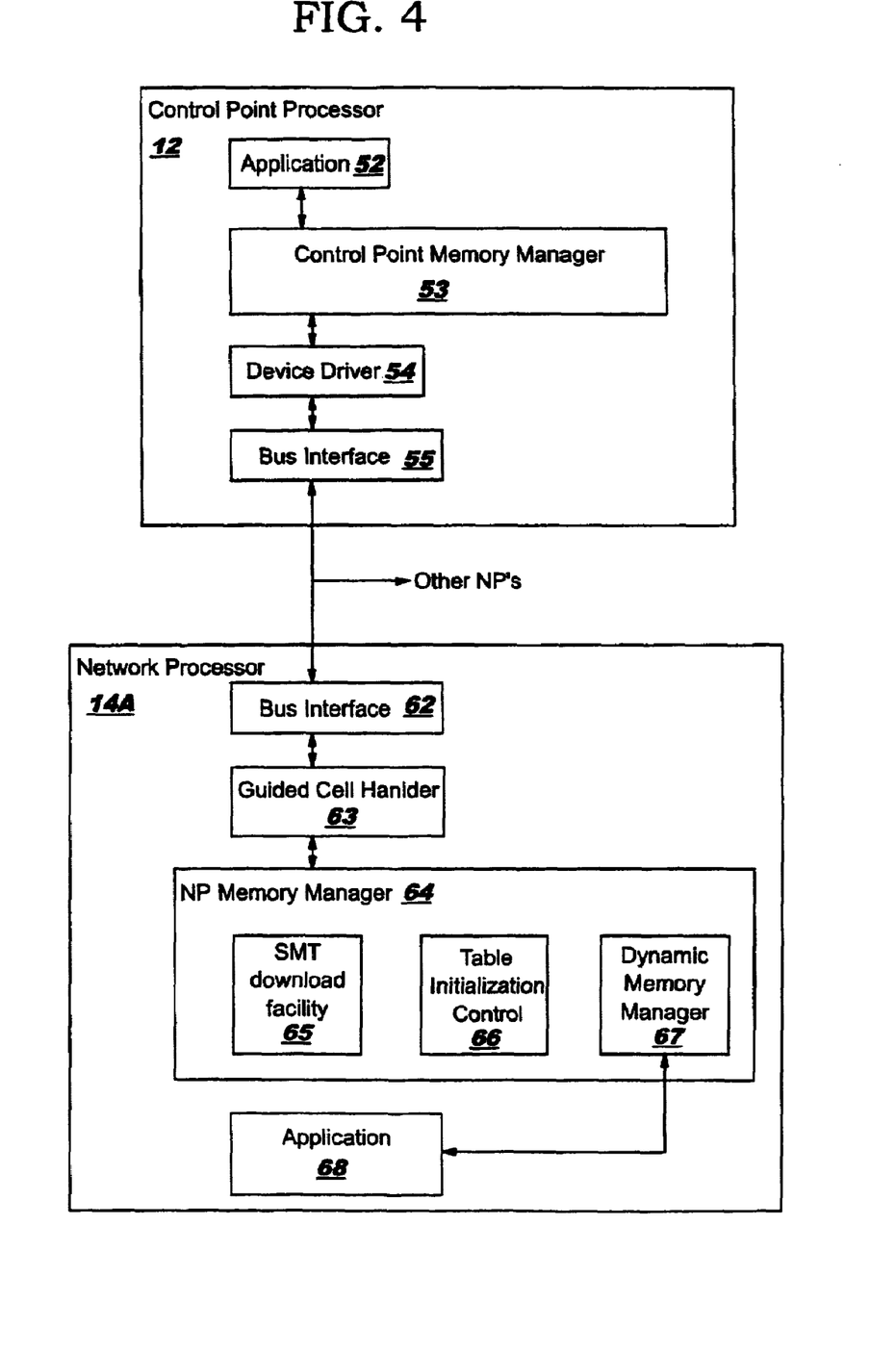
FIG. 4 is a block diagram depicting the software modules that implement the method and system of the present invention.

Referring now to FIG. 4, the software modules that implement the method and system of the present invention are depicted. A dynamic memory manager includes two portions, namely, a control point memory manager (CPMM) 53 and an NP memory manager 64. The CP component of the dynamic memory manager resides within memory coupled to CPU 12, and the NP component resides within memory coupled to NP 14A. Within CPU 12, an application software 52 provides control of network processing performed by network processors 14A–14C. In order to allocate memory for data storage on NPs 14A–14C, application software 52 communicates with application programming interfaces (APIs) in CPMM 53. These APIs provide allocation and deallocation services for memory on NPs 14A–14C as well as read/write access services and request for memory status information such as the remaining free space. The APIs may also provide selection of fast or slow memory allocation and transfer operations from one memory to another within NPs 14A–14C. Unlike ordinary procedure calls and ordinary memory allocation schemes within operating systems such as AIX (manufactured by IBM Corporation of Armonk, N.Y.) or UNIX, the APIs in the dynamic memory manager are not synchronous.

In order to provide allocation services without delaying application execution or interrupting NP 14A–14C processing, the response to allocation and access requests is asynchronous, reporting results after the transaction has propagated to NPs 14A–14C. The dynamic memory manager also supports multicast memory allocation and access, in that multiple NPs may be specified in each request, for example a multicast API allows CPU 12 to allocate space and write data on a particular subset of NPs 14A–14C in a single set of operations: a single allocate call and a single write call. The dynamic memory manager notifies the CP application 52 via CPMM 53 when all of the responses have been received or when an error (including timeout due to no response from one or more NPs) has occurred.

In order to accomplish asynchronous operation and organize data that is owned by applications, a Register( ) and De-Register( ) API are provided by the dynamic memory manager. Applications register themselves with the DMM and a table is built to record the allocations requested by the application. When the application calls De-Register( ), the DMM waits for pending requests to timeout, then deletes all of the tokens held by the application.

The operations supported by the dynamic memory manager CP component (the part of the dynamic memory manger resident within CPU 12) include the Register( ) and De-Register( ) APIs, along with Read( ), Write( ), Resize( ), Allocate( ) and Deallocate( ) APIs. Additional inquiries are available to return the amount of free memory and information on availability of memories with different access speeds. For example, a CP application preparing to download a frame processing algorithm that will be used frequently may want to determine if enough free bytes are available in fast on-chip memory to hold the code implementing the algorithm. A CheckMemoryAvailability( ) API is provided this purpose.

Packets representing memory operations are propagated to a bus connecting CPU 12 with NPs 14A–14C. A device driver 54 provides packaging of the information required for the request, i.e. token and data for a write request, into stimuli for a bus interface 55. The bus that connects the NPs and the CPU 12 may be an Ethernet connection, an Fibre Channel connection or some other interface that allows bidirectional communications.

Within NP 14A, the bus packets are received by a bus interface 62 and decoded by guided cell handler 63, which then communicates the requests encapsulated within the packets to the NP component of the dynamic memory manager 64. The dynamic memory manager then may allocate or access memory 43 coupled to the NP. An SMT download facility 65 provides allocation for SMTs that are downloaded to NP 14A. Table initialization control 66 sets up the framework for the NP component 64 of the dynamic memory manager. The tables created track allocations and tokens that have been passed to applications and provide data for converting received token information to pointers so that physical locations within the NP can be accessed. Applications 68 executing within NP may also allocate and access memory using these mechanisms so that a common interface is provided between applications running on the CPU 12 and applications running on the NPs.

By using a single token to refer to a particular datum created by an application, multiple applications or multiple instances running on the various processors can refer to the same datum, even though it is located within different memories at unique addresses. For example a request to delete a particular record that was allocated on multiple processors could be broadcast to all processors. The deallocation would proceed on those processors for which the record exists and fail on those on which it did not exist. The results of a memory operation are returned to the application by a callback mechanism that is provided during application registration. The callback is made by the dynamic memory manager supplying the token and result for each of the targeted NPs. The callback routine in the application can then determine the results of the operations that were asynchronously queued earlier. The use of the token provides a mechanism that allows the application to identity which requests are completed and which are still pending.

The dynamic memory manager may also block requests depending on the status of pending requests associated with a given token. For example, the write operation should be blocked if an allocate request is pending, since the physical location has not been assigned and there is no target yet for the write data.

Figure 5:
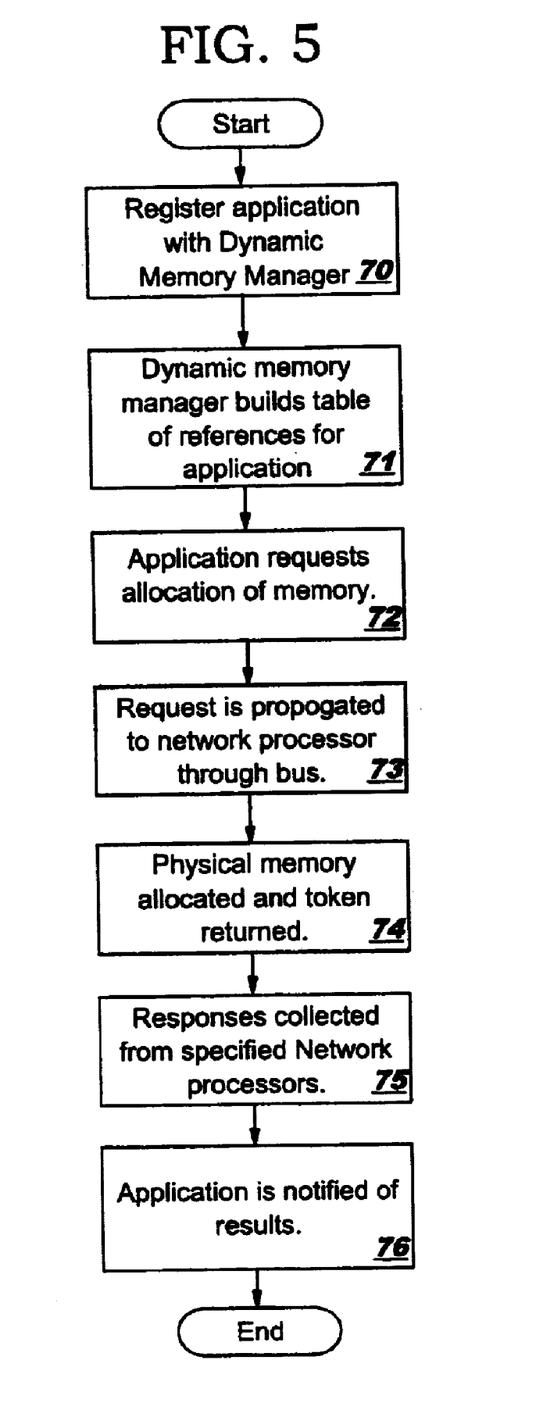
FIG. 5 is flowchart depicting a method for managing memory in network subsystem, in accordance with an embodiment of the present invention.

Referring to FIG. 5, a flowchart of a method for managing memory in a network processing system in accordance with an embodiment of the invention is depicted. An application registers with the dynamic memory manager (step 70) and the dynamic memory manager builds a table of references for the application (step 71). The application can then request allocation of memory (step 72) and that request is propagated to one or more network processors on the bus (step 73). Physical memory is allocated within the NP subsystem and a token is returned to refer to the allocation (step 74). The responses to the allocation request are returned from the NPs and collected by the dynamic memory manager (step 75). The application is then notified of the results of the allocation (step 76).

Figure 6:
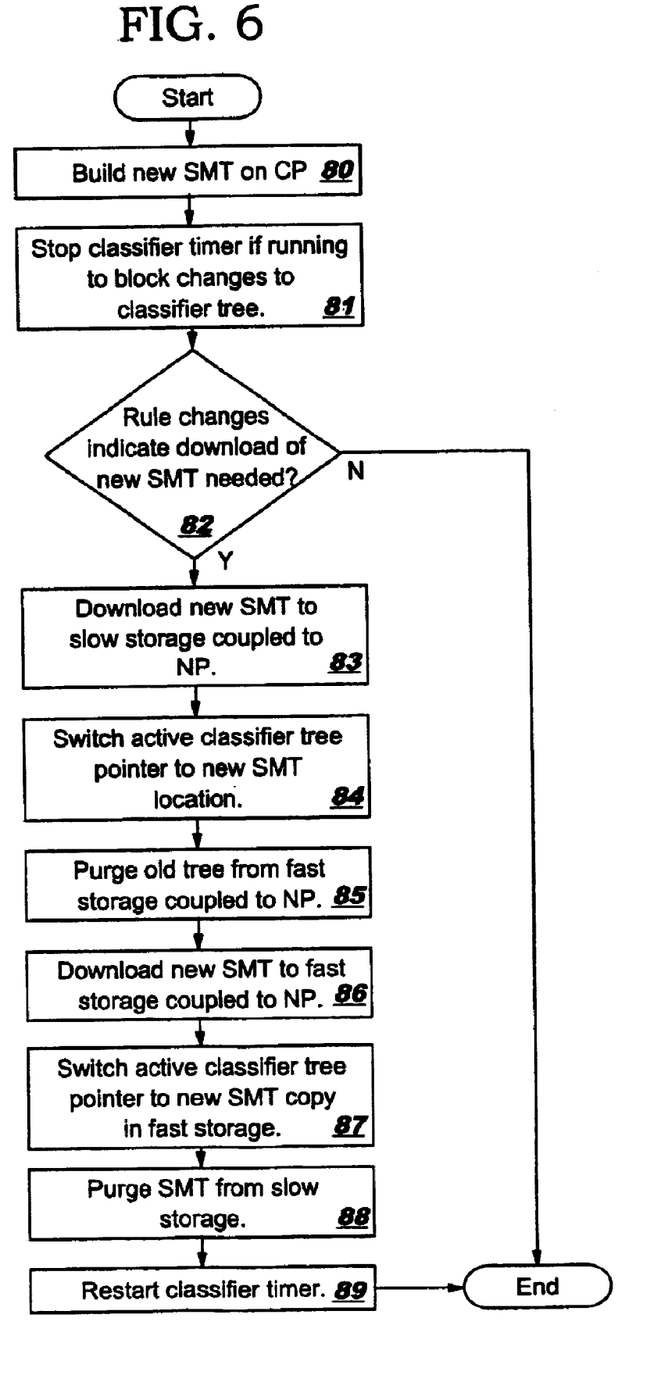
FIG. 6 is flowchart depicting a method for downloading a software managed tree to a network processor, in accordance with an embodiment of the present invention.

Referring now to FIG. 6, a flowchart of a method of downloading an SMT in accordance with a preferred embodiment of the invention is depicted. The SMT download facility 65 provides storage allocation for the SMTs that are downloaded and the multiple storage allocations used to maintain frame classifier operation while the new SMT is downloaded. A new SMT is built on CPU 11 (step 80) and the classifier timer is stopped if it is already running (step 81). This prevents applications running on CPU 11 or NPs 14A–14C from making any additions or changes to the SMT while the download of a new SMT proceeds. The new SMT is checked to determine if rule changes have occurred which require download of the new SMT (step 82) and if not, the process ends. If the SMT needs to be downloaded, it is generally first downloaded to slow storage (step 83), since fast storage is a limited resource and there may not be enough fast storage (either internal memory within NP 40 or external memory 43 such as ZBT SRAM 17).

The pointer that specifies the location of the active SMT for the NP frame processor TSE 45 is changed to point at the newly downloaded SMT (step 84). Then the old SMT is purged from fast memory (step 85). Another copy of the new SMT is downloaded to fast memory (step 86). Finally, the active classifier tree pointer is changed to point at the new SMT copy in fast memory (step 87), the SMT is purged from slow storage (step 88), and the classifier timer is restarted (step 89). This accomplishes an update of the SMT without halting operation of the TSE 45 while maximizing the size of available fast memory. If the SMT was not temporarily used from slow memory, then the fast memory would have to be larger to accommodate the old SMT and the new SMT, or the operation of TSE 45 would be interrupted while the download is being performed.

It is not necessary to perform the download twice to perform the method of the present invention. For instance, SMT download may occur in a network processing system where all memory is accessible at the same speed.

In this configuration, a single download is performed and the active pointer is switched to the new SMT location, since there would be no added benefit from recovering the location of the old SMT.

While the preferred embodiment of the invention has is illustrated with a configuration having a single CPU and multiple NPs, the present invention may be implemented in a system having multiple CPUs and a single NP, or other variants providing control of network routing and processing. It will be understood by those skilled in the art that various changes in form and detail may be made therein without departing from the spirit and scope of the invention.

What is claimed is:

1. A method for managing memory in a network processing system having a control point processor (CP) coupled to a plurality of network processors (NPs) via a bus, said method comprising:
    providing a control point memory manager within said CP;
    providing an NP memory manager within each of said plurality of NPs;
    in response to a request of an allocation of memory by an application within said CP, transmitting said request from said CP to said plurality of NPs over said bus to request an allocation of a memory location within one of said plurality of NPs; and
    allocating a physical memory within one of said plurality of NPs and returning a token representing said memory allocation from said one of said NPs to said control memory manager such that read/write accesses to said physical memory are available to said application.

2. The method of claim 1, wherein said method further includes registering said application within said control point memory manager.

3. The method of claim 2, wherein said method further includes building a table of references by said control point memory manager, wherein said table of references contain said registered application.

4. The method of claim 1, wherein said method further comprises:
    collecting responses from said plurality of NPs;
    waiting until a response has been received or a timeout has occurred from each of said plurality of NPs; and
    notifying said application that all of said request has completed.

5. The method of claim 4, wherein said notifying is performed by a callback mechanism that calls back a callback routine within said application.

6. The method of claim 1, said method further comprising:
    requesting that a data value be written to a location corresponding to said allocation by providing said token within a transmission from said CP to said NP over said bus; and
    in response to receiving said transmission, writing said data value to said location.

7. The method of claim 1, further comprising:
    requesting that a data value be read from a location corresponding to said allocation by providing said token within a transmission from said CP to said NP over said bus; and
    in response to receiving said transmission, retrieving said data value from said location and returning said data value to said CP.

8. The method of claim 1, wherein said request contains a value specifying a preference for allocation of fast memory, and wherein said allocating allocates fast memory on said NP in conformity with said value.

9. The method of claim 1, wherein said method further comprises rejecting an access to said allocation until a pending operation is complete.

10. The method of claim 1, wherein said method further comprises:
requesting a memory availability information from said plurality of NPs, wherein said request specifies a memory speed category, and wherein said request is transmitted over said bus to said plurality of NPs; and
in response to said request, returning said memory availability information from said plurality of NPs over said bus.

11. A network processing system, said network processing system comprising:
a control point processor (CP);
a plurality of network processors (NPs) coupled to said CP via a bus;
a control point memory manager within said CP;
an NP memory manager within each of said plurality of NPs;
in response to a request of an allocation of memory by an application within said CP, means for transmitting said request from said CP to said plurality of NPs over said bus to request an allocation of a memory location within one of said plurality of NPs; and
means for allocating a physical memory within one of said plurality of NPs and returning a token representing said memory allocation from said one of said NPs to said control memory manager such that read/write accesses to said physical memory are available to said application.

12. The network processing system of claim 11, wherein said network processing system further includes means for registering said application with said control point memory manager.

13. The network processing system of claim 12, wherein said network processing system further includes means for building a table of references by said control point memory manager, wherein said table of references contain said registered application.

14. The network processing system of claim 11, wherein said network processing system further includes
means for collecting responses from said more than one network processor,
means for waiting until one of a response has been received or a timeout has occurred from each of said more than one NP, and
means for notifying said application that all of said requests have completed, in response to an end of said wait.

15. The network processing system of claim 14, wherein said notification is provided by a callback mechanism within said CP that calls back a callback routine within said application and wherein an address of said callback routine is supplied by said application upon said registration.

16. The network processing system of claim 11, wherein said that network processing system further includes
means for requesting a data value be written to a location corresponding to said allocation by providing said token within a transmission from said CP to said NP over said bus, and
means for writing said data value to said location in response to said NP component receiving said transmission.

17. The network processing system of claim 11, wherein said network processing system further includes
means for requesting a data value be read from a location corresponding to said allocation by providing said token from said CP to said NP over said bus, and
in response to receiving said transmission, means for retrieving said data value from said location and returns said data value to said CP.

18. The network processing system of claim 11, wherein said request contains a value specifying a preference for allocation of fast memory, and wherein said allocating means allocates fast memory on said NP in conformity with said value.

19. The network processing system of claim 11, wherein said network processing system further includes a means for rejecting an access to said allocation until a pending operation has been completed.

20. The network processing system of claim 11, wherein said network processing system further includes
means for requesting a memory availability information from said plurality of NPs, wherein said request specifies a memory speed category, wherein said request is transmitted over said bus to said plurality of NPs, and
in response to said request, means for returning said memory availability information from said plurality of NPs over said bus.

* * * * *